(12) United States Patent
Bulyshev

(10) Patent No.: US 10,366,480 B2
(45) Date of Patent: Jul. 30, 2019

(54) SUPER-RESOLUTION SYSTEMS AND METHODS

(71) Applicant: Analytical Mechanics Associates, Inc., Hampton, VA (US)

(72) Inventor: Alexander Bulyshev, Virginia Beach, VA (US)

(73) Assignee: ANALYTICAL MECHANICS ASSOCIATES, INC., Hampton, VA (US)

( * ) Notice: Subject to any disclaimer, the term of this patent is extended or adjusted under 35 U.S.C. 154(b) by 230 days.

(21) Appl. No.: 15/638,772

(22) Filed: Jun. 30, 2017

(65) Prior Publication Data

US 2018/0005361 A1 Jan. 4, 2018

Related U.S. Application Data

(60) Provisional application No. 62/357,480, filed on Jul. 1, 2016.

(51) Int. Cl.
*G06T 5/50* (2006.01)
*G06T 11/00* (2006.01)
*G06T 3/40* (2006.01)

(52) U.S. Cl.
CPC ............ *G06T 5/50* (2013.01); *G06T 3/4053* (2013.01); *G06T 11/006* (2013.01); *G06T 2207/10048* (2013.01); *G06T 2207/10116* (2013.01); *G06T 2207/20056* (2013.01)

(58) Field of Classification Search
CPC ....... G06T 5/50; G06T 3/4053; G06T 11/006; G06T 2207/10048; G06T 2207/10116; G06T 2207/20056
See application file for complete search history.

(56) References Cited

U.S. PATENT DOCUMENTS

| | | |
|---|---|---|
| 8,494,687 B2 | 7/2013 | Vanek et al. |
| 8,587,696 B2 | 11/2013 | Georgis et al. |
| 8,712,175 B2 | 4/2014 | Iketani |
| 8,817,124 B2 | 8/2014 | Hara |
| 8,923,653 B2 | 12/2014 | Yamamoto et al. |
| 9,020,302 B2 | 4/2015 | Shmunk |
| 9,064,476 B2 | 6/2015 | Sun et al. |
| 9,076,234 B2 | 7/2015 | Zheng et al. |
| 9,111,367 B2 | 8/2015 | Liu et al. |
| 9,208,537 B1 | 12/2015 | Hu et al. |
| 9,230,303 B2 | 1/2016 | Kanaev et al. |

(Continued)

OTHER PUBLICATIONS

Chen et al., "Super-resolution fusion of complementary panoramic images based on cross-selection kernel regression interpolation," *Applied Optics*, Mar. 2014; 53(9):1918-28.

(Continued)

*Primary Examiner* — Phuoc Tran
(74) *Attorney, Agent, or Firm* — Mueting, Raasch & Gebhardt, P.A.

(57) ABSTRACT

Exemplary super-resolution methods and systems may generate, or create, a super-resolution based on a plurality of low-resolution images. Such exemplary methods and systems may utilize image registration and back-projection to provide intermediate imaging data, and then use inverse problem solving to remove any back-projection effects as well as noise to generate a super-resolution image.

24 Claims, 8 Drawing Sheets

(56) References Cited

U.S. PATENT DOCUMENTS

| | | |
|---|---|---|
| 9,240,033 B2 | 1/2016 | Li et al. |
| 9,245,315 B2 | 1/2016 | S V et al. |
| 9,256,922 B2 | 2/2016 | Zagaynov et al. |
| 9,258,518 B2 | 2/2016 | Salvador et al. |
| 2009/0232213 A1* | 9/2009 | Jia ........................ G06T 3/4053 375/240.16 |
| 2011/0234757 A1* | 9/2011 | Zheng .................... G02B 21/36 348/46 |

OTHER PUBLICATIONS

Lucas, "An Iterative Image Registration Technique with an Application to Stereo Vision," *Proceedings of Imaging Understanding Workshop*, 1981; 121-130.

Lucas, "Generalized Image Matching by the Method of Differences," (Doctoral Dissertation), *Carnegie-Mellon University*, Jul. 1984; 1-161.

Park et al., "Super Resolution Image Restoration: A Technical Review," *IEEE Signal Processing Magazine*, May 2003; 20(3):21-36.

Prabhu et al., "Unified multiframe super-resolution of matte, foreground, and background," *J Opt Soc Am A Opt Image Sci Vis.*, Aug. 2013; 30(8):1524-34.

Tao et al., "A novel method of surface exploration: Super-resolution restoration of Mars repeat-pass orbital imagery," *Planetary and Space Science*, 2016; 121:103-114.

Zhang et al., "Multiframe image super-resolution adapted with local spatial information", *J Opt Soc Am A Opt Image Sci Vis.*, Mar. 2011; 28(3):381-90.

\* cited by examiner

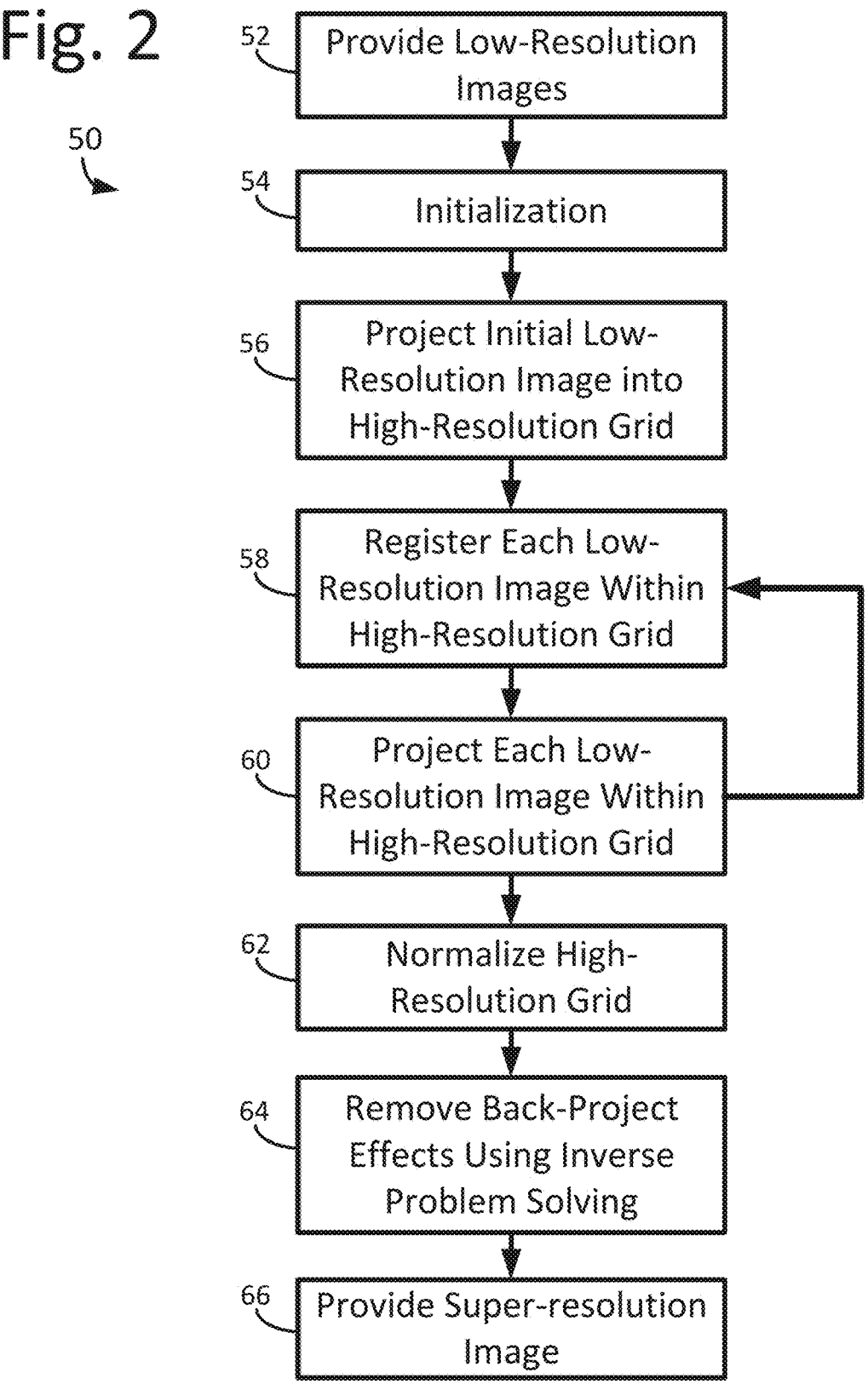

SUPER-RESOLUTION SYSTEMS AND METHODS

This application claims the benefit of U.S. Provisional Application Ser. No. 62/357,480, filed on Jul. 1, 2016, which is incorporated by reference herein.

The present disclosure pertains to systems and methods for generating super-resolution images from a plurality of low-resolution images.

Super-resolution processes may be described as image enhancement processes that convert a set of low-resolution images of a "same" scene into a high-resolution image, i.e., an image having higher resolution than each of set of low-resolution images. Often, the reason why images have low spatial resolution is a low number of photodetectors in a focal plane array of a camera taking, or capturing, the images.

Generally, the exemplary super-resolution systems and methods described herein may be applied to a wide variety of areas of imaging. For example, the exemplary super-resolution systems and methods may be used in the processing of satellite images, images from surveillance cameras, and images from infrared cameras. Further, for example, the exemplary super-resolution systems and methods may also be used in medical applications, aerial applications, and even in non-professional digital photography.

Many attempts have been made to improve the spatial resolution of an image by combining a set of low-resolution images into one high-resolution image. Differing varieties of interpolation-type image processing have been used in many of these attempts. Although such interpolation-type approaches have been shown to be useful, such approaches usually provide a very limited level of digital magnification such as less than 2×. Some other approaches have used implied knowledge of a digital filter using some theoretical models.

SUMMARY

The exemplary super-resolution system and methods may be described as using one or more super-resolution processes, or algorithms, that are capable of converting a set of low-resolution images into a high-resolution image. The exemplary processes, or algorithms, may use inverse problem solving as opposed to any variety of interpolation. The exemplary super-resolution systems and methods may be generally described as including two major parts: an image registration part; and an image reconstruction part. The image registration part may be described as finding the exact location and orientation of the footprint of a low-resolution image on a high-resolution grid such that, e.g., the low-resolution image may be projected onto the correct location on the high-resolution grid. The image reconstruction part may include two major steps: a back-projection step; and an inverse filtering step. The back-projection step, or procedure, may be described as "filling out" the high-resolution grid using data from the low-resolution images. The back-projection step may be effectively described as a "de-averaging" process. The result of the back-projection step may be a two-dimensional convolution of the "true" image with a point spread function with a known shape (e.g., a triangular point spread function). The inverse filtering step may then be performed on the back-projected data to provide a super-resolution image. The exemplary image processing described herein may also include another major initialization part. The initialization part may generally be described as reading the very first low-resolution image, or image frame, and establishing computational domain, stationary coordinate system, high-resolution grid, and the initial position and orientation of the camera relative to the computational domain.

One exemplary method for generating a super-resolution image of an object of interest may include providing an initial low-resolution image of an object of interest and projecting the initial low-resolution image into a high-resolution grid. The high-resolution grid may define a higher resolution than the initial low-resolution image. The exemplary method may further include providing a plurality of low-resolution images of the object of interest obtained from a plurality of different positions relative to the object of interest, registering the plurality of low-resolution images within the high-resolution grid such that each image of the plurality of images is shifted less than one pixel away from the initial low-resolution image, and projecting the plurality of low-resolution images into the high-resolution grid to provide an intermediate super-resolution image. The exemplary method may further include removing back-projection effects from the intermediate super-resolution image using inverse problem solving to provide a super-resolution image of the object of interest.

One exemplary system for generating a super-resolution image of an object of interest may include imaging apparatus and computing apparatus. The imaging apparatus may include one or more imaging sensors to capture low-resolution images of an object of interest. The computing apparatus may include one or more processors and be configured to receive a plurality of low-resolution images of the object of interest obtained from a plurality of different positions relative to the object of interest from the imaging apparatus. The computing apparatus may be further configured to project an initial low-resolution image the plurality of low-resolution images into a high-resolution grid, where the high-resolution grid defines a higher resolution than the initial low-resolution image. The computing apparatus may be further configured to register the remainder of the plurality of low-resolution images within the high-resolution grid such that each image of the plurality of images is shifted less than one pixel away from the initial low-resolution image, project the remainder of the plurality of low-resolution images into the high-resolution grid to provide an intermediate super-resolution image, and remove back-projection effects from the intermediate super-resolution image using inverse problem solving to provide a super-resolution image of the object of interest.

In one or more embodiments, removing back-projection effects from the intermediate super-resolution image to provide an improved image the object of interest may include using an inverse transform. In one or more embodiments, removing back-projection effects from the intermediate super-resolution image to provide an improved image the object of interest may include using a function representative of the back-projection effects. For example, the function representative of the back-projection effects may be a triangular-shaped point spread function.

In one or more embodiments, the higher resolution image may define a resolution that is greater than 10 larger than the initial low-resolution image.

In one or more embodiments, registering the plurality of low-resolution images within the high-resolution grid may include determining a state vector for each of the plurality of low-resolution images with respect to the projected initial low-resolution image within the high-resolution grid. In at least one embodiment, determining a state vector for each of the plurality of low-resolution images with respect to the projected initial low-resolution image within the high-resolution grid may include determining the state vector for each of the plurality of low-resolution images with respect to the projected initial low-resolution image within the high-resolution grid based on an image intensity density function. Further, in at least one embodiment, projecting the plurality of low-resolution images into the high-resolution grid may include positioning the plurality of low-resolution images into the high-resolution grid based on an image intensity density function.

In one or more embodiments, the method may further include or the computing apparatus may be further configured to execute normalizing each pixel of the high-resolution grid. Further, in at least one embodiment, each pixel of the high-resolution grid may include a cumulative intensity value representative of the cumulative intensity of the plurality of low-resolution images projected on the pixel of the high-resolution grid and a counter value representative of the number of times the plurality of low-resolution images projected on the pixel of the high-resolution grid. Also, normalizing each pixel of the high-resolution grid may include dividing the cumulative intensity value by the counter value for each pixel of the high-resolution grid.

In one or more embodiments, removing back-projection effects from the intermediate super-resolution image using inverse problem solving may further include applying an image stabilization function to remove at least some noise.

In one or more embodiments, the initial low-resolution image and the plurality of low-resolution images of the object of interest may include one of infrared images, visual images, ultraviolet images, and X-ray images.

One exemplary embodiment may be described as a two-dimensional super-resolution method including image registration and image restoration procedures. The exemplary image registration method may be an iterative procedure that uses the image intensity distribution to place low-resolution images into a common area. The exemplary image restoration method may serve to actually construct a super-resolution, or high-resolution, image from the set of low-resolution images. The restoration process may include an iterative procedure for de-averaging the low-resolution images on each iterative step using back-projection procedures and regularized inverse filtering procedures. The exemplary inverse filtering procedures may use two-dimensional fast Fourier transforms. Further, a regularization parameter may be used in accordance with the measured noise associated with the imaging modality used.

In at least one embodiment, the low-resolution images may be captured using an infrared camera, and thus, may use an infrared specific regularization function as further described herein. In at least one embodiment, the low-resolution images may be captured using a visual surveillance camera, and thus, may use a visual camera specific regularization function as further described herein. In at least one embodiment, the low-resolution images may be captured using an ultraviolet camera, and thus, may use an ultraviolet specific regularization function as further described herein. In at least one embodiment, the low-resolution images may be captured using an X-ray machine or scanner, and thus, may use an X-ray specific regularization function as further described herein.

In one or more embodiments, the exemplary systems and methods may provide for the digital magnification up to 20x. In one or more embodiments, the exemplary systems and methods may further include an image acquiring module, an initialization module, an external iterative module, a back-projection module, an image registration module, and an inverse filtering module including a regularization function.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIG. 2 is a flow diagram of an exemplary super-resolution method to generate super-resolution images from a plurality of low-resolution images using, e.g., the system of FIG. 1.

DETAILED DESCRIPTION OF EXEMPLARY EMBODIMENTS

Exemplary methods, apparatus, and systems shall be described with reference to FIGS. 1-12. It will be apparent to one skilled in the art that elements or processes from one embodiment may be used in combination with elements or processes of the other embodiments, and that the possible embodiments of such methods, apparatus, and systems using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

It may be described that the present disclosure includes image processing that is capable of creation of a high-resolution image using a set of low-resolution images. The term "resolution" may be used in sense of spatial resolution meaning the ability to resolve two closely-located features of an image. Sometimes, the pixel size (or total number of pixels) of an image is used for the measure of the spatial resolution, which may not always be an accurate description. The disclosure herein will use the terms "high-resolution image," "super-resolution image," and "low-resolution image." It is be understood that both a high-resolution image and a super-resolution image has a higher resolution than a low-resolution image, and conversely, a low-resolution image has a lower resolution than both of a high-resolution image and a super-resolution image.

In some embodiments, higher and lower resolutions may be described in terms of pixel-size, two-dimensional dimensions of an image in terms of pixels (e.g., X-axis dimension of pixels versus a Y-axis dimension of pixels), and/or a total amount of pixels per image. In these embodiments, high-resolution images and super-resolution images may have smaller pixels, greater two-dimensional dimensions in terms of pixels, and/or more pixels than low-resolution images, and conversely, low-resolution images may have larger pixels, smaller two-dimensional dimensions in terms of pixels, and/or less pixels than high-resolution images and super-resolution images.

Figure 1:
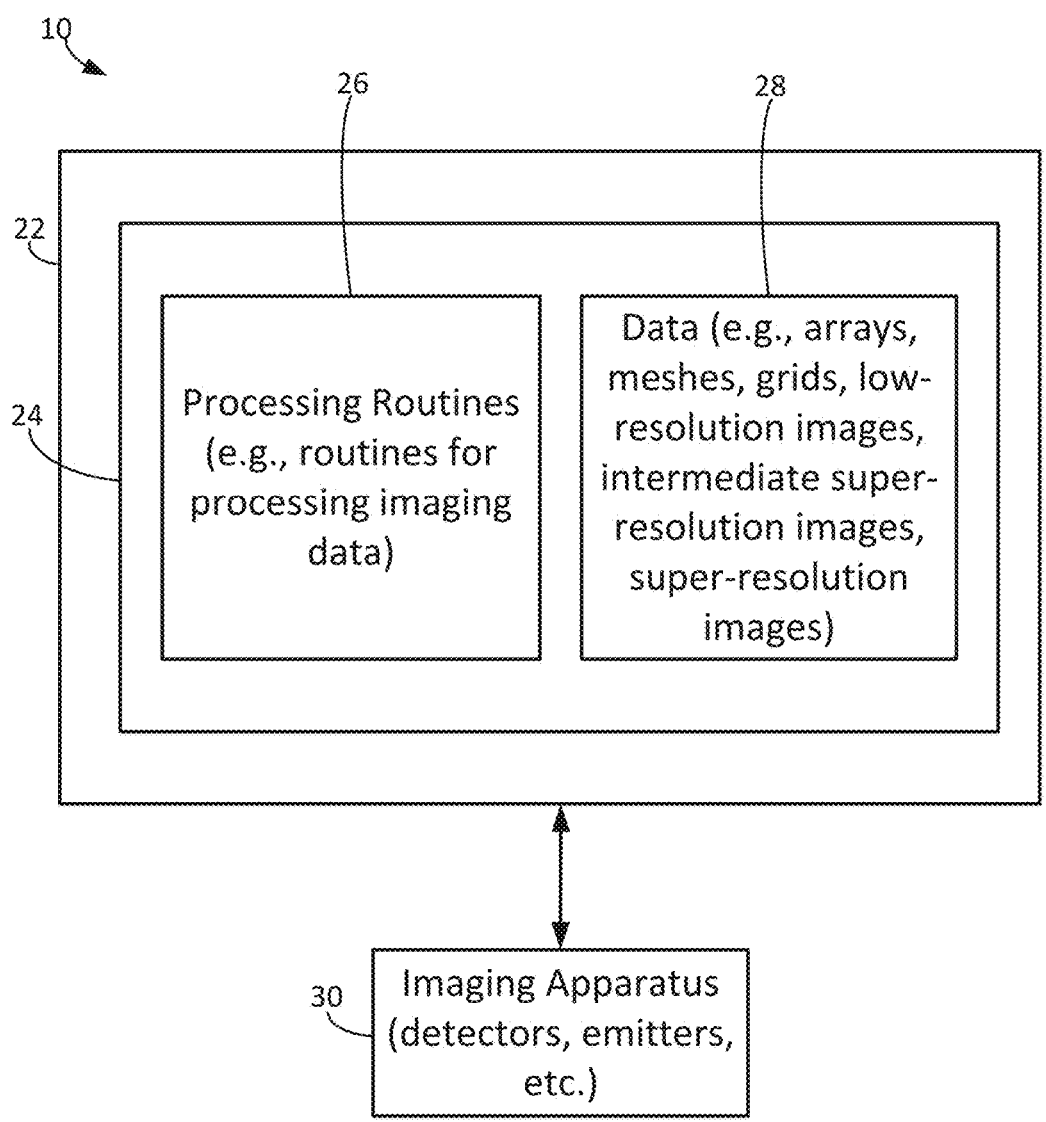
FIG. 1 is a block diagram of an exemplary super-resolution system to generate super-resolution images from a plurality of low-resolution images.

An exemplary super-resolution system 10 for use in generating super-resolution images from a plurality of low-resolution images as described herein is depicted in FIG. 1. The system 10 may include a processing apparatus, or a processor, 22 and imaging apparatus 30. Generally, the imaging apparatus 30 may include any one or more devices configured to provide one or more images to the processing apparatus 22. The imaging apparatus 30 may include any apparatus, structure, or devices configured to capture, or take, images. For example, the imaging apparatus 30 may include one or more sensors such as e.g., charged coupled devices (CCD), complementary-metal-oxide-semiconductor (CMOS) sensors, indium Gallium Arsenide (InGaAs) sensors, Mercury Cadmium Telluride (HgCdTe) sensors, etc. and/or one or more emitters or transducers such as, e.g., X-ray emitters, etc. Additionally, the imaging apparatus 30 may be further described in terms of the various imaging modalities. For example, the imaging apparatus 30 may be configured to capture, or take, human-visible images, X-ray images, infrared images, ultraviolet images, etc. In essence, the imaging apparatus 30 may be configured to capture, or take, images across a wide portion, or swath, of the electromagnetic spectrum, and the exemplary super-resolution processes may be configured to generate super-resolution images based on such captured images.

Images captured by the imaging apparatus 30 may be provided to the processing apparatus 22, e.g., such that the processing apparatus 22 may generate super-resolution images from the captured images. The captured images may be provided to the processing apparatus 22 in a variety of different ways. For example, the captured images may be transferred to the processing apparatus 22 through a wired or wireless data connection between the processing apparatus 22 and the imaging apparatus 30. Further, for example, the captured images may be transferred to the processing apparatus 22 through another data transfer device such as a memory stick or other data storage device.

Additionally, the captured images from the imaging apparatus 30 may transferred, and then analyzed by, the processing apparatus 22 at any time. For example, the captured images may be transferred to the processing apparatus 22 as soon as the images are captured such that the processing apparatus 22 can analyze the capture images and generate a super-resolution image in or close to "real time." Further, for example, the captured images may be transferred to the processing apparatus 22 after a time period has elapsed from when the images were captured (e.g., days after, months after, years after, etc.). In other words, the time period from when the images where captured to when the images are analyzed and used to generate a super-resolution image by the processing apparatus 22 may be inconsequential.

Further, it is be understood that the exemplary systems and methods described herein can be applied in imaging for large variety of electromagnetic wave frequencies. For example, infrared imaging may be an attractive area of application of super-resolution because infrared photodetectors may be less sensitive, and thus, may have a relatively large size, which may lead to a low number of detectors in a focal plane array, and thus, a low spatial resolution. Further, for example, the exemplary super-resolution systems and methods may be used to enhance quality of images obtained in the visible spectrum in cases such as, e.g., surveillance cameras, images taken with a large field of view, etc. Visual cameras of very high quality exist, but often, cheap, low-resolution cameras are used for surveillance, and thus, super-resolution may be useful for surveillance. Also, images taken with a large field of view from a substantial distance may mean that tiny details may be missed, and thus, the exemplary super-resolution systems and methods may be used to improve such large field of view images such as those taken, or captured, by in satellite imaging, aerial imaging, professional photography, and non-professional photography. Still further, for example, ultra-violet light may be used in astrophysical imaging and in photography in forensic applications. In cases of taking a pictures from a significant distance, under shallow look angle, or assessing old and degraded photos, the exemplary super-resolution systems and methods may help to enhance image quality significantly. Yet still further, in X-ray imaging, the exemplary super-resolution systems and methods may be used in airport, sea port, building, etc. security applications. For example, suspected objects like handguns, knives, grenades, etc. may have a relatively large size, and thus, may be easily detected using X-ray imaging. However, thin layers of explosives, for example, may be difficult to detect with current X-ray imaging technology, and thus, the super-resolution systems and methods described here may be used to enhance X-ray images so as to reveal smaller details (e.g., like thin layers of explosives).

As described herein, the processing apparatus 22 may be operably coupled to the imaging apparatus 30 to receive a plurality of images from the imaging apparatus 30. The processing apparatus 22 may be further operably coupled to the imaging apparatus 30 to facilitate imaging of an object of interest using the imaging apparatus 30. For example, the processing apparatus 22 may control the image capture using the imaging apparatus 30, and then may perform the super-resolution processes on the captured images. In other words, the processing apparatus 22 may be configured to control and/or initiate the functionality of the imaging apparatus 30 for use in imaging an object Further, the processing apparatus 22 includes data storage 24. Data storage 24 allows for access to processing programs or routines 26 and one or more other types of data 28 that may be employed to carry out the exemplary super-resolution methods. For example, processing programs or routines 26 may include programs or routines for performing computational mathematics, matrix mathematics, inverse filtering algorithms, Fourier transforms, image registration processes, image reconstruction processes, compression algorithms, calibration algorithms, image construction algorithms, inversion algorithms, signal processing algorithms, normalizing algorithms, deconvolution algorithms, averaging algorithms, standardization algorithms, comparison algorithms, vector mathematics, or any other processing required to implement one or more embodiments as described herein.

Data 28 may include, for example, captured images (e.g., low-resolution images captured by the imaging apparatus 30), intermediate processing images, super-resolution images, arrays, meshes, grids, variables, counters, statistical estimations of accuracy of results, results from one or more processing programs or routines employed according to the disclosure herein (e.g., reconstructed images of an object of interest), or any other data that may be necessary for carrying out the one or more processes or methods described herein.

In one or more embodiments, the system 10 may be implemented using one or more computer programs executed on programmable computers, such as computers that include, for example, processing capabilities (e.g., microcontrollers, programmable logic devices, etc.), data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or processes as described herein or as would be applied in a known fashion.

The program used to implement the processes described herein may be provided using any programmable language, e.g., a high level procedural and/or object orientated programming language that is suitable for communicating with a computer system. Any such programs may, for example, be stored on any suitable device, e.g., a storage media, readable by a general or special purpose program, computer or a processor apparatus for configuring and operating the computer when the suitable device is read for performing the procedures described herein. In other words, at least in one embodiment, the system 10 may be implemented using a computer readable storage medium, configured with a computer program, where the storage medium so configured causes the computer to operate in a specific and predefined manner to perform functions described herein.

Likewise, the system 10 may be configured at a remote site (e.g., an application server) that allows access by one or more users via a remote computer apparatus (e.g., via a data connection), and allows the one or more users to employ the functionality according to the present disclosure (e.g., users access graphical user interfaces associated with one or more programs to process data).

The processing apparatus 22 may be, for example, any fixed or mobile computer system (e.g., a personal computer or minicomputer). The exact configuration of the computing apparatus is not limiting and essentially any device capable of providing suitable computing capabilities and control capabilities (e.g., control the imaging set up configuration and acquire data, such as imaging data) may be used. Further, various peripheral devices, such as a computer display, mouse, keyboard, memory, printer, scanner, etc. are contemplated to be used in combination with the processing apparatus 22. Further, in one or more embodiments, the output (e.g., an image, image data, an image data file, an array, a mesh, a high-resolution grid, a digital file, a file in user-readable format, etc.) may be analyzed by a user, used by another machine that provides output based thereon, etc. As described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writeable by processing apparatus 22 described herein. Also, as described herein, a file in user-readable format may be any representation of data (e.g., ASCII text, binary numbers, hexadecimal numbers, decimal numbers, audio, graphical) presentable on any medium (e.g., paper, a display, sound waves, etc.) readable and/or understandable by a user.

In view of the above, it will be readily apparent that the functionality as described in one or more embodiments according to the present disclosure may be implemented in any manner as would be known to one skilled in the art. As such, the computer language, the computer system, or any other software/hardware that is to be used to implement the processes described herein shall not be limiting on the scope of the systems, processes or programs (e.g., the functionality provided by such systems, processes or programs) described herein.

One will recognize that a graphical user interface may be used in conjunction with the embodiments described herein. The user interface may provide various features allowing for user input thereto, change of input, importation or exportation of files, or any other features that may be generally suitable for use with the processes described herein. For example, the user interface may allow default values to be used or may require entry of certain values, limits, threshold values, or other pertinent information.

The methods described in this disclosure, including those attributed to the systems, or various constituent components, may be implemented, at least in part, in hardware, software, firmware, or any combination thereof. For example, various aspects of the techniques may be implemented by the processing apparatus 22, which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary methods and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions on a computer-readable medium such as RAM, ROM, NVRAM, EEPROM, FLASH memory, magnetic data storage media, optical data storage media, or the like. The instructions may be executed by the processing apparatus 22 to support one or more aspects of the functionality described in this disclosure.

An exemplary method 50 for generating super-resolution images from a plurality of low-resolution images is depicted in FIG. 2. The method 50 may first include providing a plurality of low-resolution images of an object of interest 52. It is to be understood that, although a plurality of low-resolution images may be defined as including at least two low-resolution images, the exemplary super-resolution method 50 may generate a better super-resolution image when using more than just a couple low-resolution images. For example, the plurality of low-resolution images uses by the super-resolution method 50 may include greater than or equal to about 10 low-resolution images, greater than or equal to about 20 low-resolution images, greater than or equal to about 50 low-resolution images, greater than or equal to about 100 low-resolution images, greater than or equal to about 200 low-resolution images, greater than or equal to about 500 low-resolution images, greater than or equal to about 1000 low-resolution images, etc.

After receiving, or being provided, at least the first low-resolution image, the exemplary method 50 may initialize 54 the computational framework for generating a super-resolution image from the plurality of low-resolution images of the object of interest. For example, the initialization may include analyzing the first low-resolution image, and based thereon, introducing an image coordinate system, calculating the size of the computational domain, and creating a fine grid for the super-resolution image construction. Further, this exemplary initiation process or procedure 54 may include assigning a dislocation of the center of the first low-resolution image, or image frame, relative to the center of coordinates (e.g., for use in the registration of low-resolution images as described further herein).

More specifically, in at least one embodiment, the super-resolution method 50 may be initialized 54 by defining a fine mesh $\Theta$ where each cell is assigned a 2-D index k identifying its associated pixel. Further, working arrays H(k) and C(k) may be created with the same dimensions as $\Theta$. The H(k) array may be the "collector" for intensity inputs from different image frames, or low-resolution images, for the cell number k and the C(k) array may be the counter (e.g., every time a pixel is updated, or collected, into the H(k) array, the corresponding C(k) will be increased by one to "count" how many times each H(k) element is updated). All the elements of the H(k) and C(k) arrays are initialized to zero.

Then, the first, or initial, low-resolution image may be projected into the computational framework 56. More specifically, the first low-resolution image may be back-projected into the H(k) array and each element of the C(k) array may be increased by one.

The remainder of the plurality of low-resolution images (i.e., the low-resolution images other than the first, or initial, low-resolution image) may not be "centered" about the first low-resolution image, and thus, the computational framework such that each of the remainder of the plurality of low-resolution images may be back-projected thereon. Thus, the exemplary method 50 includes registration of each of the plurality of low-resolution images 58 into the computational framework (e.g., the arrays, the high-resolution grid, etc.). In other words, the registration procedure 58 serves to find the exact location and orientation of the footprint of low-resolution image on the high-resolution grid. In one or more embodiments, the image registration algorithm may be similar to the Lucas & Kanade approaches (B. D Lucas and T. Kanade (1981), *An iterative image registration technique with an application to stereo vision*. Proceedings of Imaging Understanding Workshop, pages 121-130; and Bruce D. Lucas (1984), *Generalized Image Matching by the Method of Differences* (doctoral dissertation), each of which are incorporated by reference herein in their entireties).

Further, it is to be understood that different images may be the result of different camera positions and orientations, which may be described in terms of different state vectors. The state vector (e.g., or at least knowledge of the change in the state vector) for each different each may be used during image registration. For example, in at least one embodiment, the position and orientation of the camera (e.g., the camera that is capturing, or taking, the low-resolution images) relative to the stationary coordinate system can be described by a state vector:

$$V=(X,Y,\alpha) \qquad (1)$$

where X and Y are rectangular coordinates in the stationary coordinate system, and $\alpha$ is the angle of rotation around the optical axis of the camera. The initial value of the state vector may be determined on the initialization process 54 based on the data from the very first image frame, or low-resolution image, in the set. After recording the second image frame, or low-resolution image, the changes in the state vector may be calculated as follows:

Assuming that the true intensity of the scene is known, a frame model can be defined as:

$$R(V)=T \qquad (2)$$

where R is the camera model, and T is the intensity frame. The T dimension is equal to the total number of detectors in the camera array. The first derivative of R over V can be denoted as:

$$B = \frac{\partial R(V)}{\partial V} \qquad (3)$$

where B is the matrix. In the first order of magnitude, the following equations can be written:

$$T_{i+1}-T_i=R(V_{i+1})-R(V_i)\approx B\times(V_{i+1}-V_i), i=1,\ldots,M$$

$$V_{i+1}=V_i+(B^+B)^{-1}\times(T_{i+1}-T_i) \qquad (4)$$

where $V_i$, $V_{i+1}$ are values of the state vector corresponding to two consecutive camera image frames acquired at times $T_i$, $T_{i+1}$, and matrix $B^+$ is conjugated of B. Index i numerates the consecutive frames. M is the maximum number of frames which is chosen for imaging. Equations (4) may work adequately in case of small changes in state vector during the time between two consequent frames. In case that this is not true, the process shown by equations (4) can be improved by internal iterations:

$$V_{i+1}^k=V_i+(B^+B)^{-1}\times(T_{i+1}-R(V_i^{k-1})), k=1,\ldots,L$$

$$V_{i+1}^0=V_i \qquad (5)$$

Figure 3B:
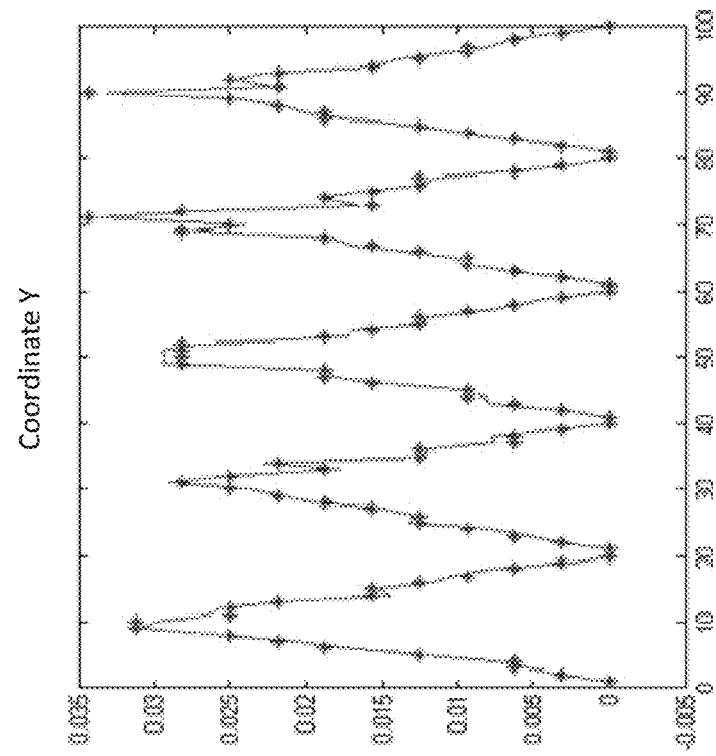
FIG. 3B is a graph depicting results of an exemplary image registration process showing the "true" Y coordinate of an image and the restored Y coordinate based on the image registration process for a plurality of low-resolution images.
Figure 3A:
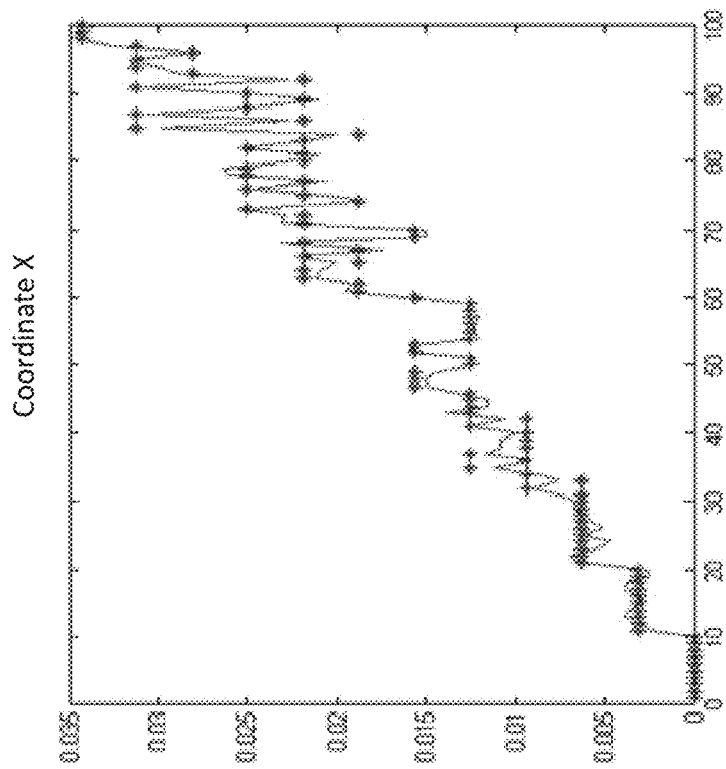
FIG. 3A is a graph depicting results of an exemplary image registration process showing the "true" X coordinate of an image and the restored X coordinate based on the image registration process for a plurality of low-resolution images.

After the value for state vector for the second image frame, or second low-resolution image, is established, a back-projection process 60 for the second image frame, or low-resolution image, may be used to update the computational framework for the super-resolution image. Graphs depicting results of an exemplary image registration process are shown in FIGS. 3A-3B. The x-axis of the graphs represents the plurality of low-resolution images being registered and the y-axis of the graphs represents the amount of X- and Y-coordinate offset from the initial low-resolution image for each of the plurality of low-resolution images. The "true" X coordinate of an object of interest in a plurality of images is depicted by the line in the graph of FIG. 3A and the "true" Y coordinate of the object of interest in the plurality of images is depicted by the line in the graph of FIG. 3B. The asterisks in each of the graphs of FIGS. 3A-3B show the restored positions of the object of interest within the computational framework such as a high-resolution grid. As shown in this example, the asterisks follow the lines relatively closely indicating that the registration processes performed well. In other words, although the registration process 58 was not perfect, the process was acceptable. Generally, in this example, any distortions likely occurred due to noise.

The image registration 58 and back-projection 60 may occur one-at-time for each of the plurality of low-resolution images as indicated by the return arrow from the back-projection box 60 to the image registration box 58 or, at least in some embodiments, the registration 58 may occur for all or many of the plurality of low-resolution images prior to the back projection 60. As discussed further herein, the exemplary method 50 may register 58 and back project 60 each image frame, or low-resolution image, one-at-a-time.

Generally, back projection 60 may be described as having an object of interest imaged within a fixed, low-resolution pixel grid, generating additional images with the same low-resolution pixel size but with sub-pixel shifts in the camera position, and then superimposing or averaging the first image and additional images to yield a back-projection image.

In at least one embodiment, the back projection process may be realized by the following steps. First, for each image frame or low-resolution image, the projection of the focal plane array (FPA) in the area of imaging in stationary coordinate system is determined. The state vector of the camera, V=(X, Y, α), is defined in a coordinate system fixed relative to chosen coordinate system. Taking into account that the each detector has a rectangular shape, the same procedure may be repeated for rays originating from the four corner points of each individual detector which ultimately permits a determination of the projection of each individual detector pixel on the high-resolution grid Θ. Next, the set of cells from the mesh Θ that overlaps with the FPA projection onto a target plane are determined. Since the projection of the detector field of view on the ground surface may not necessarily be rectangular, all partially overlapping cells may be considered to be completely included in the projection. Next, each of the arrays H(k) and C(k) may be updated as follows:

$$H(k) \Rightarrow H(k)+T(k)$$

$$C(k) \Rightarrow C(k)+1 \quad (6)$$

Then, this operation may be continued for all detectors in the current image frame or low-resolution image, and the following normalization process 62 may be performed:

$$D(k)=H(k)/C(k) \quad (7)$$

where D(k) provides the average intensity value for each cell. In other words, each cell (e.g., representing each pixel) may be divided by the amount of times it was updated to normalize the intensity value.

It is to be understood that, for fixed low-resolution pixel size, increasing the number of superimposed low-resolution images may improve resolution. However, the rate of improvement may slow asymptotically as more low-resolution images are added/superimposed. Further, a certain fuzziness may remain even if an infinite amount of low-resolution image are superimposed/back-projected. Still further, the fuzziness of the back-projected image may reduce only when the low-resolution pixel size is reduced when using many low-resolution images. Yet still further, the width of the halo (fuzziness) of the back-projected image may be equal to the low-resolution pixel size when using many low-resolution images.

After each of the images frames or low-resolution images have been registered 58, back projected 60, and then normalized 62, the resultant image, or image data array representative of an image, may be fuzzy and convoluted image since, e.g., the back projected image is "spread out" over two times the pixel width, etc. Basically, using image registration 58 and back projection 60 alone will likely result in a fuzzy image with a halo effect of width equal to the pixel size. Further, the direction and/or type of movement of the camera, or imaging apparatus, may change the effects due to back projection. For example, when using back projection processes 60 in case of swiping movement of a camera through the scene may lead to a back-projected image that is the true image convoluted with a triangular-shaped point spread function (PSF). More specifically, in the limit, as the pixel shifts go to zero, and as the number of projection images goes to infinity, a back-projection image approaches a triangle represented by the following PSF: $K(x-x_0)$.

Further, for example, it can be shown that a PSF ($\Pi(x,y)$) with a pyramid shape may be formed in a general case of random camera movement. Thus, the exemplary method 50 may use a known PSF to solve the inverse problem of the back-projected image to remove the back-projection effects 64. For instance, one can approximate the back projection result as:

$$D=\Pi \otimes H_t = \iint \Pi(x-x',y-y')H_t(x',y')dx'dy' \quad (8)$$

where D is the results (e.g., an intermediate super-resolution image, resultant back-projected image, etc.) of the back projection process 60 and normalization process 62, and $H_t$ is the super-resolution image result that method 50 is attempting to obtain. In order to restore the super-resolution image, inverse filtering may be applied as shown below:

$$H_t = \Pi^{-1} \otimes D \quad (9)$$

Equation (9) may provide the solution of the inverse problem in an ideal noiseless situation. In real world situations, noise could distort the solution, and thus, noise filtering may be added to the back projection effect removal process 64. The deconvolution of (8) and numerical filtering of a noise component can be done efficiently in the frequency domain. Thus, the filtered image in the frequency domain may be presented as:

$$\hat{H}(\omega_x, \omega_y) = \frac{\hat{\Pi}^+(\omega_x, \omega_y) \times \hat{D}(\omega_x, \omega_y)}{(\hat{\Pi}^+(\omega_x, \omega_y) \times \hat{\Pi}(\omega_x, \omega_y) + \alpha \times \hat{\Omega}(\omega_x, \omega_y))} \quad (10)$$

where a cap symbol may mean a Fourier transformed image of the real function, + means complex conjugation, ($\omega_x$, $\omega_y$) are spatial frequencies in X and Y directions, α is the scalar parameter, and $\hat{\Omega}(\omega_x, \omega_y)$ is a stabilization function may serve to filter the noise. The choice of stabilization function may be performed in accordance with the noise statistics for different imaging devices. For example, stabilization functions may be chosen for different devices have different noise characteristic. For an IR camera, the following stabilization function may be used:

$$\hat{\Omega}(\omega_x,\omega_y)=1+|\omega_x|+|\omega_y|+|\omega_x \times \omega_y| \quad (11)$$

For a visual camera, the following stabilization function may be used:

$$\hat{\Omega}(\omega_x,\omega_y)=1+|\omega_x|^2+|\omega_y|^2 \quad (12)$$

For a UV camera, the following stabilization function may be used:

$$\hat{\Omega}(\omega_x,\omega_y)=1+|\omega_x|+|\omega_y|+|\omega_x \times \omega_y|+\omega_x^2+\omega_y^2 \quad (13)$$

For a X-ray image, the following stabilization function may be used:

$$\hat{\Omega}(\omega_x,\omega_y)=\exp(\omega_x^2+\omega_y^2) \quad (14)$$

Numerical implementation of inverse filtering may use fast Fourier transforms (FFT), and a regularization parameter of the low pass filter may be determined with accordance of the camera noise level. Namely, the regularization parameter may be the solution of the equation:

$$\|D-D_\alpha\|^2=\delta^2 \quad (14)$$

where D is 2D array of the measured intensities of the image frame and $D_\alpha$ is the model values of this array taking into account filter (10).

After the effects from back-projection effects and noise have been removed, or at least reduced, through process 64, the super-resolution image may be provided 66 by the method 50. In other words, the result the of the exemplary method 50 may be a super-resolution image, which is provided by removing, or reducing, the back-projection effects and noise from the intermediate normalized image from the previous processes.

It is to be understood that the processes described herein with respect to the exemplary super-resolution method 50 are merely one example, and other processes are contemplated which may perform the same or similar functionality without departing from the disclosure herein. For example, another similar exemplary image registration process 58 may be described with $p_i(x)$, i=0, . . . , n denoting the gray-scale distribution of the i-th projection image where each $p_i(x)$ is a step function, the horizontal step length in $p_i(x)$ is equal to the pixel size, and each $p_i(x)$ can be non-zero only in the camera's field of view (e.g., which is typically finite). One may note that the x-axis denotes a coordinate axis attached to the projection image and is not attached to the original image. Now one may assume that, from one projection image to the next, the camera position was shifted with respect to the original image by an amount $q_i$ (e.g., less than a pixel width). Generally, one may expect that, for i=1, . . . , n, the projection image $p_i$ (x−$z_i$) may matches the projection image $p_0(x)$ best for $z_i=q_i$. Hence, an appropriate guess for finding $q_i$, i=1, . . . , n is to solve the following minimization problem:

$$\hat{q}_i = \operatorname*{argmin}_{z_i \in R} \int_{-\infty}^{+\infty} (p_i(x-z_i) - p_0(x))^2 dx, i = 1, \ldots, n \quad (15)$$

which may provide the state vector for the current projection image $p_i$. It is to be understood that the exemplary registration processes may be described as using Newton-like iterative scheme to minimize residual functional. Such minimizations may be performed over the X- and Y-coordinates of the pixel shifts of each frame. In other considered embodiments, other parameters could be included as well such as, e.g., the rotation of the XY-plane.

As described herein, the back-projected image will likely never converge to the original image. However, the exact mathematical formula that relates the original image to the back-projection image may be described by the following equation:

$$g(x) = \int_{-\infty}^{+\infty} (K(x-\xi) \cdot f(\xi)) d\xi \quad (16)$$

where $f(x)$ is the gray-scale distribution of the original image, $g(x)$ is the gray-scale distribution of the original image, and $K(x-x_0)$ is the triangle point spread function. Solving the equation (16), $$g(x) = \int_{-\infty}^{+\infty} K(x-\xi) f(\xi) d\xi,$$

for $f(x)$ may provide the solution $$f(x) = \int_{-\infty}^{+\infty} \hat{f}(s) e^{-2\pi i s x} ds \quad (17)$$

where the following apply:

$$\hat{g}(s) = \int_{-\infty}^{+\infty} g(x) e^{2\pi i s x} dx$$

$$\hat{K}(s) = \int_{-\infty}^{+\infty} K(\sigma) e^{2\pi i s x} d\sigma$$

$$\hat{f}(s) = \frac{\hat{g}(s)}{\hat{K}(s)}.$$

The exemplary systems and methods described herein were implemented as a Matlab code and used for proof of conception. Generally, the examples started with a high-resolution "true" image of an object of interest, and a set, or plurality, of low-resolution images that were created using a simulated shifted-camera position for each new image/frame. The simulated camera movement guaranteed complete coverage of the imaging area and additionally added some random components. Lastly, to make the modeling process more realistic, some random noise was added to the low-resolution images. Using such data, the exemplary systems and methods were used to generate a super-resolution image, which was then compared to the "true" image.

Figure 4:
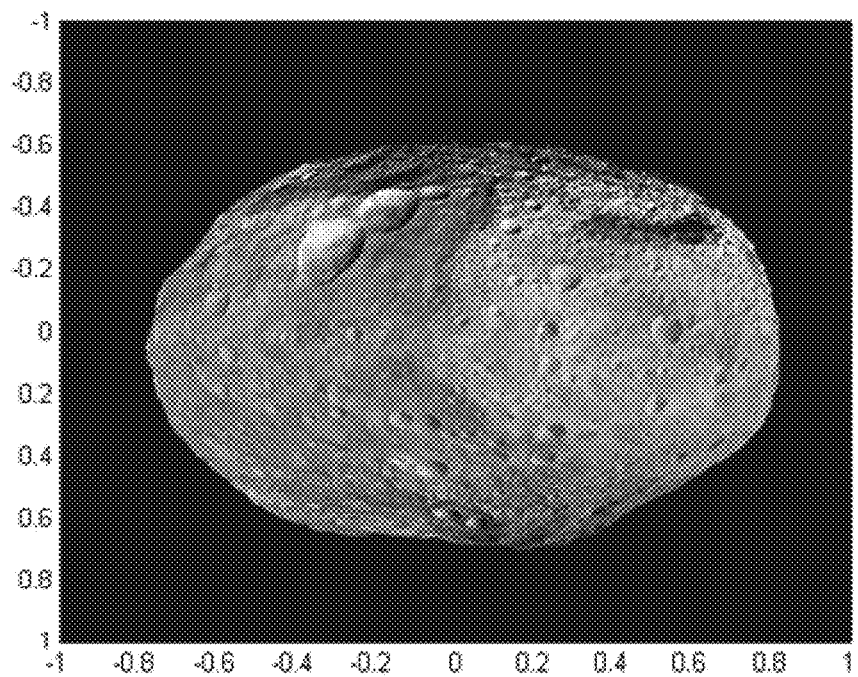
FIG. 4 is an example of a high-resolution image of an object of interest, i.e., the asteroid Vesta.
Figure 5:
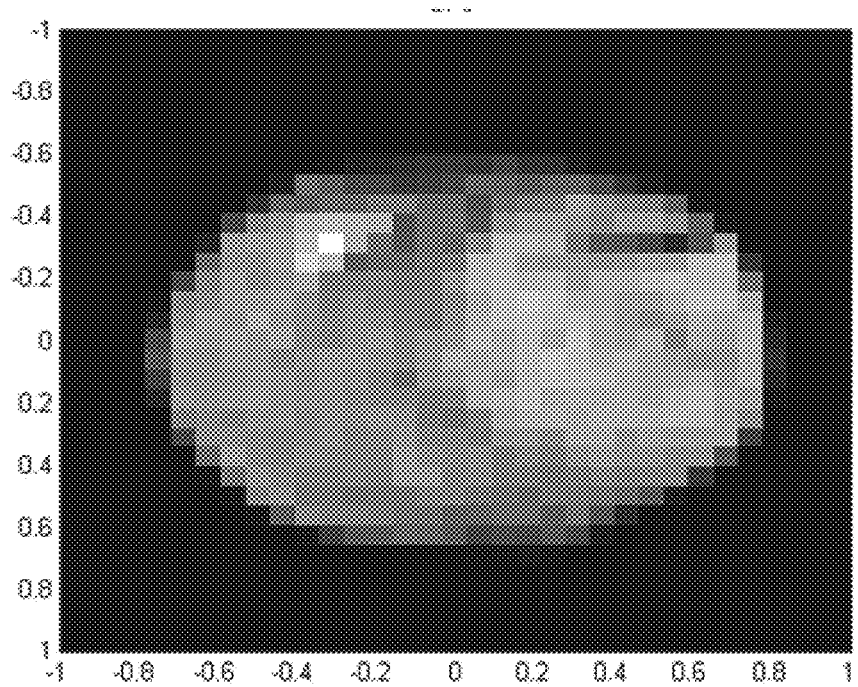
FIG. 5 is an example of a low-resolution visual image of the object of interest of FIG. 4.
Figure 6:
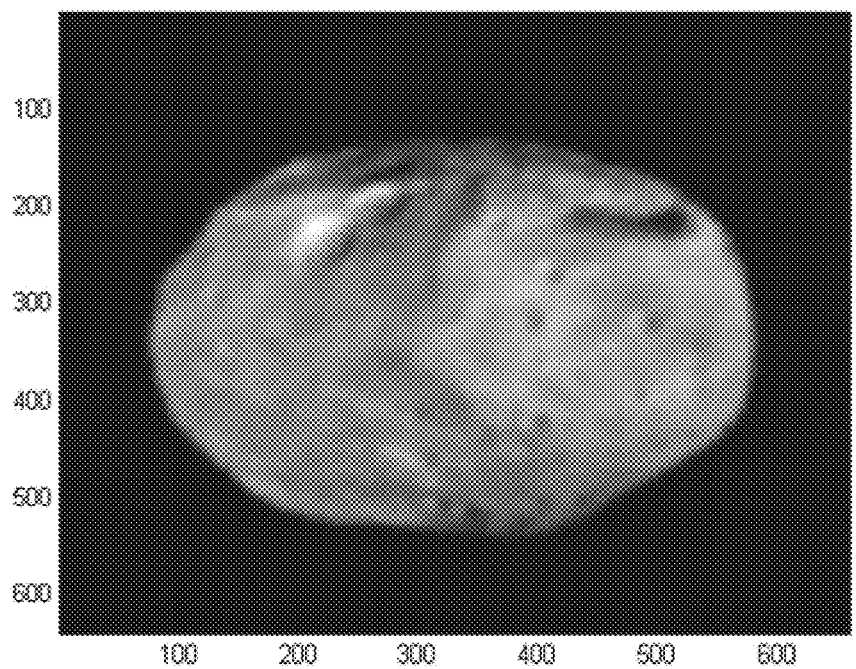
FIG. 6 is an example of a back-projected image generated, or produced, using, e.g., the system and method of FIGS. 1-2, based on a plurality of low-resolution images of the object of interest of FIG. 4.
Figure 7:
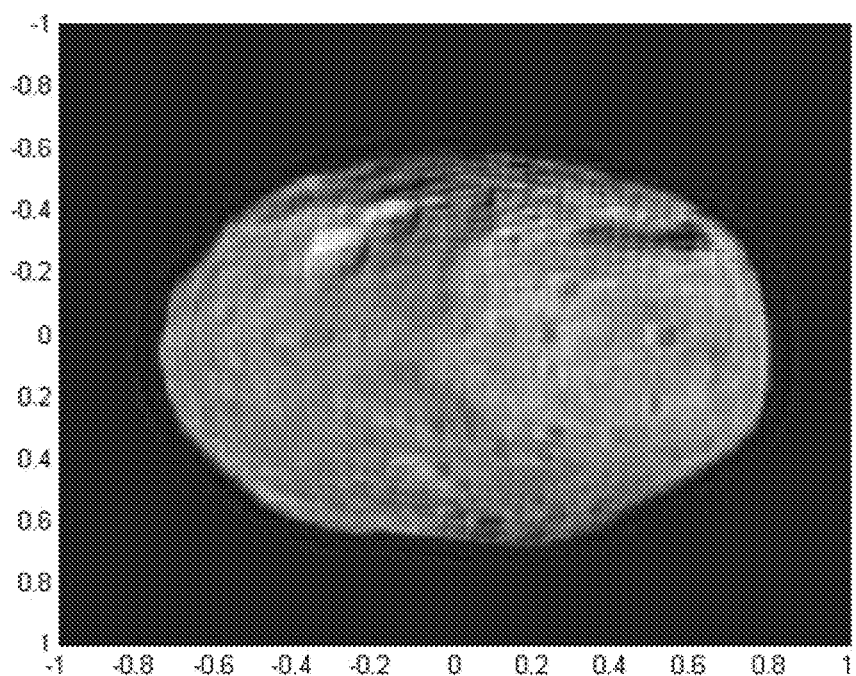
FIG. 7 is an example of a super-resolution images generated, or produced, using, e.g., the system and method of FIGS. 1-2, based on the back-projected image of FIG. 6.

Some results of such computer experiments/models are presented in FIGS. 4-7. An example of a high-resolution image of an object of interest, i.e., the asteroid Vesta, is shown in FIG. 4. The high-resolution image was used as the "true image." An example of one of a plurality of low-resolution visual images of the object of interest of FIG. 4 is shown in FIG. 5. As one can visually see, the low-resolution image of FIG. 5 has a much lower resolution than the "true image" of FIG. 4 but may be representative of a real world image captured by a low density photodetector. In this example, about 100 low-resolution images were generated using the "true image" of FIG. 4. Then, the about 100 low-resolution images were provided into the exemplary methods and systems, and each of the low-resolution images were registered 58, back-projected 60, and normalized 62 to provide the intermediate back-projection image of FIG. 6. The effects of the back-projection as well as noise were removed 64 using the exemplary inverse problem solving and noise filtering described herein to provide the super-resolution image of FIG. 7. As shown, the super-resolution image of FIG. 7 is a much improved image over the low-resolution image of FIG. 5 and the intermediate back-projected image of FIG. 6. In sum, the super-resolution image of FIG. 7 was generated by the exemplary systems and methods described herein based on a plurality of low-resolution images similar to the low-resolution image of FIG. 5.

Figure 8:
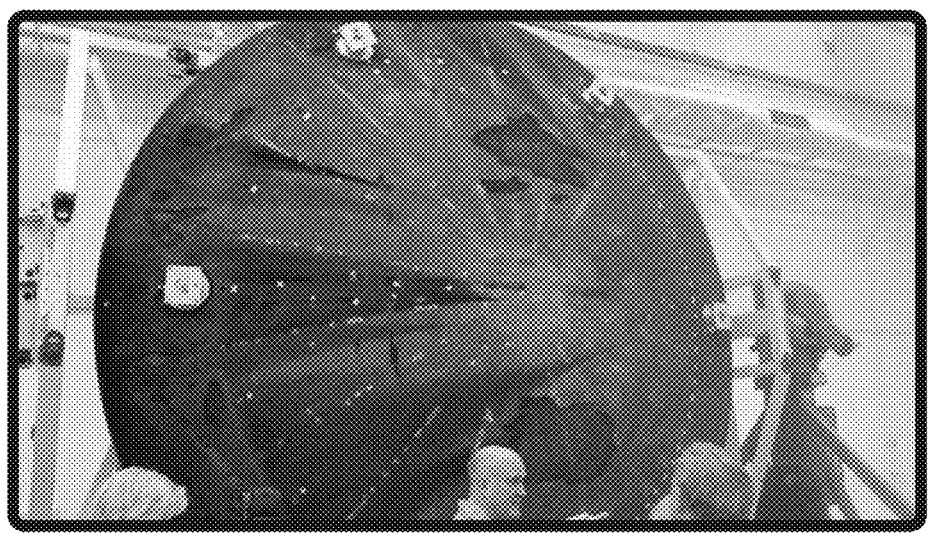
FIG. 8 is a photograph of an object of interest, i.e., a heat shield for the Orion spacecraft.

Another example is depicted in FIGS. 8-12. A photograph of an object of interest, i.e., a heat shield for the Orion spacecraft is shown in FIG. 8. The heat shield of the Orion spacecraft was infrared imaged during a test flight to determine heat source and heat sink locations. Observations were made from an airplane using a high-speed infrared camera having a 1000 pixel by 1000 pixel sensor. However, due to difficulties of pointing a camera from a moving platform, such as the airplane, towards a fast moving object, a limited amount of pixels of the image actually showed the heat shield, and thus, the exemplary super-resolution systems and methods may be used to enhance the resolution of the images of the heatshield. Although other systems and methods may have struggled with performing image enhancement due to, e.g., registration problems, etc., the exemplary systems and methods were successful.

Figure 9:
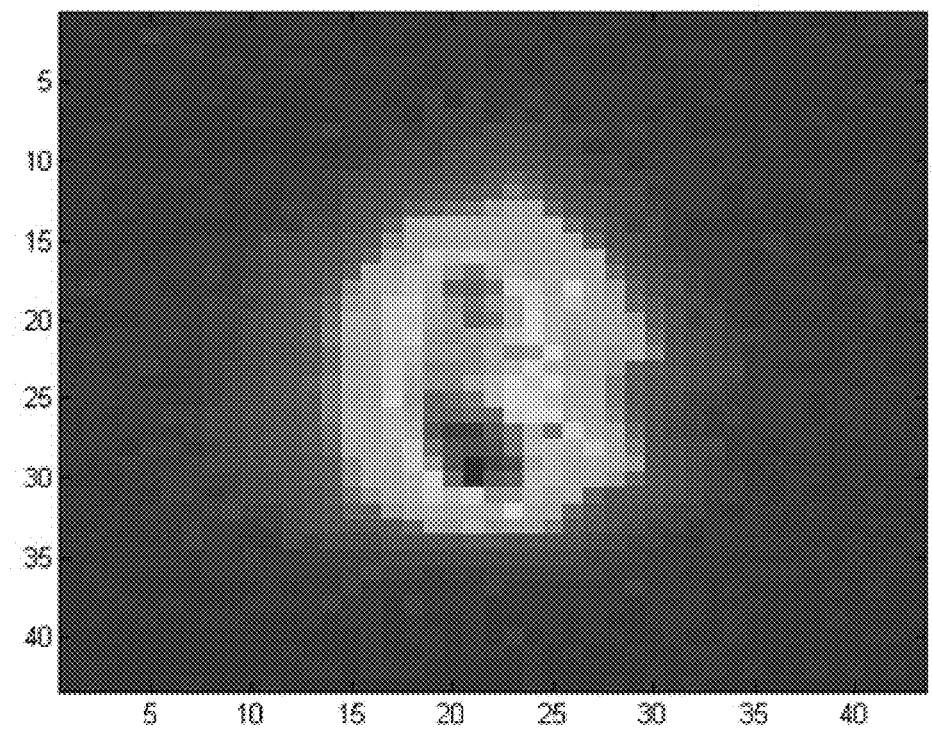
FIGS. 9-11 are examples of a low-resolution infrared images of the object of interest of FIG. 8.
Figure 10:
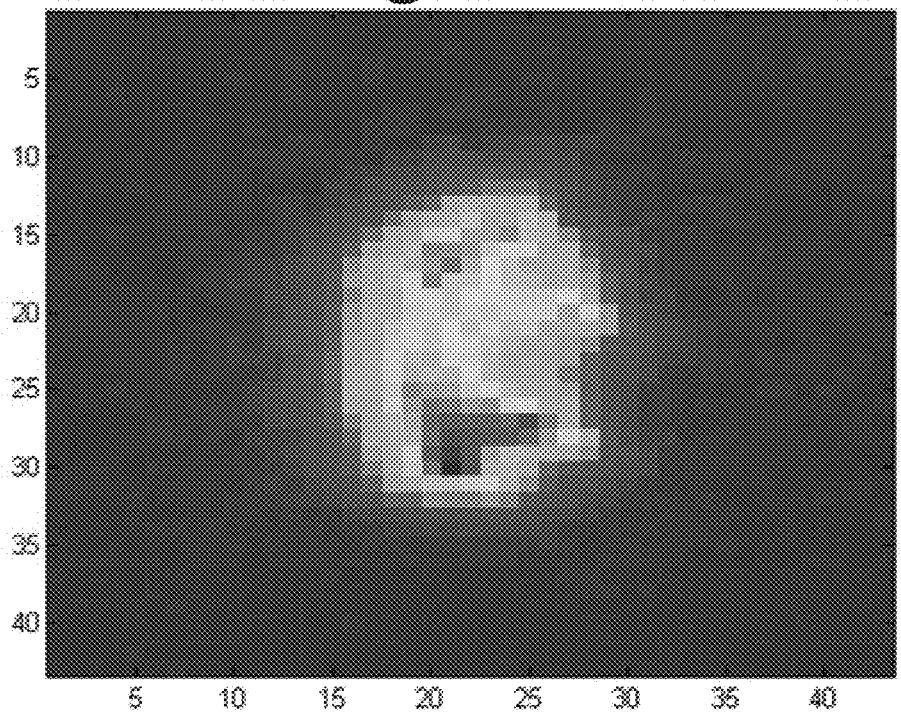
Figure 11:
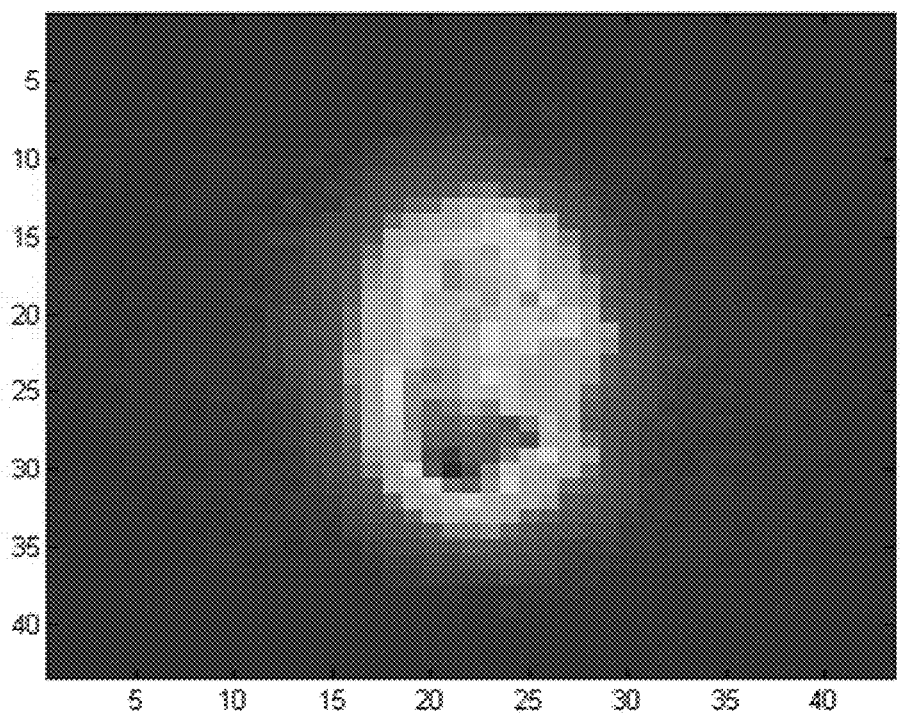
Figure 12:
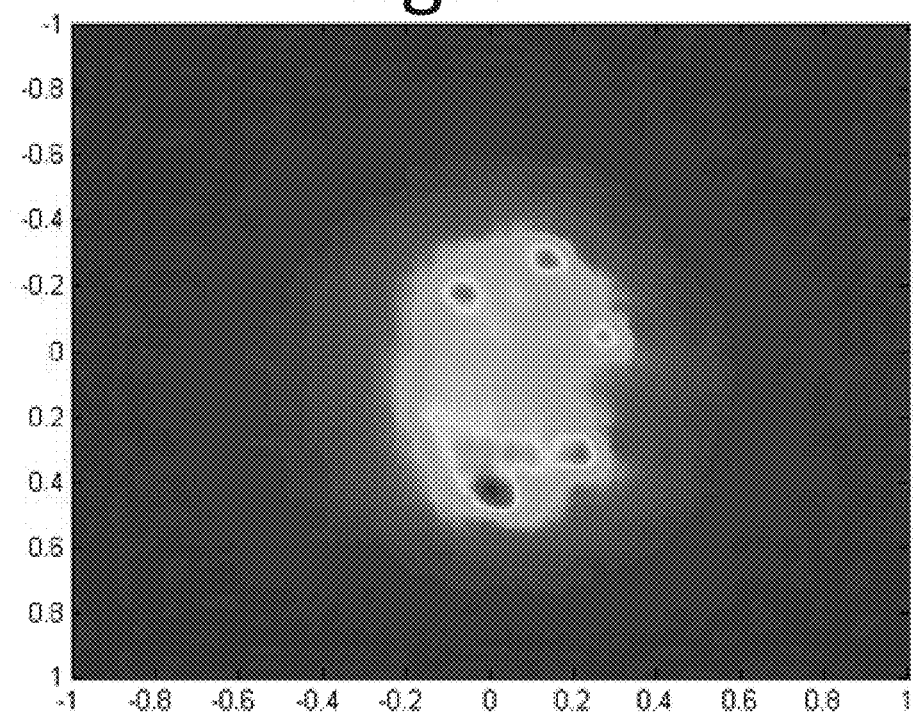
FIG. 12 is an example of a super-resolution image generated, or produced, using, e.g., the system and method of FIGS. 1-2, based on a plurality of low-resolution images of the object of interest of FIGS. 9-11.

For example, examples of low-resolution infrared images of the heat shield are shown in FIGS. 9-11 and an exemplary super-resolution image generated, or produced, using, e.g., the exemplary super-resolution systems and methods described based on a plurality of low-resolution images of the object of interest similar to those of FIGS. 9-11 is shown in FIG. 12. As one can visually see, the super-resolution image of FIG. 12 has a much improved resolution over the low-resolution images of FIGS. 9-11.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed:

1. A method for generating a super-resolution image of an object of interest comprising:
    providing an initial low-resolution image of an object of interest;
    projecting the initial low-resolution image into a high-resolution grid, wherein the high-resolution grid defines a higher resolution than the initial low-resolution image;
    providing a plurality of low-resolution images of the object of interest obtained from a plurality of different positions relative to the object of interest;
    registering the plurality of low-resolution images within the high-resolution grid such that each image of the plurality of images is shifted less than one pixel away from the initial low-resolution image;
    projecting the plurality of low-resolution images into the high-resolution grid to provide an intermediate super-resolution image; and
    removing back-projection effects from the intermediate super-resolution image using inverse problem solving to provide a super-resolution image of the object of interest.

2. The method of claim 1, wherein removing back-projection effects from the intermediate super-resolution image to provide an improved image the object of interest comprises using an inverse transform.

3. The method of claim 1, wherein removing back-projection effects from the intermediate super-resolution image to provide an improved image the object of interest comprises using a function representative of the back-projection effects.

4. The method of claim 3, wherein the function representative of the back-projection effects is a triangular-shaped point spread function.

5. The method of claim 1, wherein the higher resolution image defines a resolution that is greater than 10 larger than the initial low-resolution image.

6. The method of claim 1, wherein registering the plurality of low-resolution images within the high-resolution grid comprises determining a state vector for each of the plurality of low-resolution images with respect to the projected initial low-resolution image within the high-resolution grid.

7. The method of claim 6, wherein determining a state vector for each of the plurality of low-resolution images with respect to the projected initial low-resolution image within the high-resolution grid comprises determine the state vector for each of the plurality of low-resolution images with respect to the projected initial low-resolution image within the high-resolution grid based on an image intensity density function.

8. The method of claim 6, wherein projecting the plurality of low-resolution images into the high-resolution grid comprises positioning the plurality of low-resolution images into the high-resolution grid based on an image intensity density function.

9. The method of claim 1, wherein the method further comprises or the computing apparatus is further configured to execute normalizing each pixel of the high-resolution grid.

10. The method of claim 9, wherein each pixel of the high-resolution grid comprises:
    a cumulative intensity value representative of the cumulative intensity of the plurality of low-resolution images projected on the pixel of the high-resolution grid; and
    a counter value representative of the number of times the plurality of low-resolution images projected on the pixel of the high-resolution grid,
    wherein normalizing each pixel of the high-resolution grid comprises dividing the cumulative intensity value by the counter value for each pixel of the high-resolution grid.

11. The method of claim 1, wherein removing back-projection effects from the intermediate super-resolution image using inverse problem solving further comprising applying an image stabilization function to remove at least some noise.

12. The method of claim 1, wherein the initial low-resolution image and the plurality of low-resolution images of the object of interest comprises one of infrared images, visual images, ultraviolet images, and X-ray images.

13. A system for generating a super-resolution image of an object of interest comprising:

imaging apparatus comprising one or more imaging sensors to capture low-resolution images of an object of interest; and computing apparatus comprising one or more processors, wherein the computing apparatus is configured to:
receive a plurality of low-resolution images of the object of interest obtained from a plurality of different positions relative to the object of interest from the imaging apparatus;
project an initial low-resolution image the plurality of low-resolution images into a high-resolution grid, wherein the high-resolution grid defines a higher resolution than the initial low-resolution image,
register the remainder of the plurality of low-resolution images within the high-resolution grid such that each image of the plurality of images is shifted less than one pixel away from the initial low-resolution image,
project the remainder of the plurality of low-resolution images into the high-resolution grid to provide an intermediate super-resolution image, and
remove back-projection effects from the intermediate super-resolution image using inverse problem solving to provide a super-resolution image of the object of interest.

14. The system of claim 13, wherein removing back-projection effects from the intermediate super-resolution image to provide an improved image the object of interest comprises using an inverse transform.

15. The system of claim 13, wherein removing back-projection effects from the intermediate super-resolution image to provide an improved image the object of interest comprises using a function representative of the back-projection effects.

16. The system of claim 15, wherein the function representative of the back-projection effects is a triangular-shaped point spread function.

17. The system of claim 13, wherein the higher resolution image defines a resolution that is greater than 10 larger than the initial low-resolution image.

18. The system of claim 13, wherein registering the plurality of low-resolution images within the high-resolution grid comprises determining a state vector for each of the plurality of low-resolution images with respect to the projected initial low-resolution image within the high-resolution grid.

19. The system of claim 18, wherein determining a state vector for each of the plurality of low-resolution images with respect to the projected initial low-resolution image within the high-resolution grid comprises determine the state vector for each of the plurality of low-resolution images with respect to the projected initial low-resolution image within the high-resolution grid based on an image intensity density function.

20. The system of claim 18, wherein projecting the plurality of low-resolution images into the high-resolution grid comprises positioning the plurality of low-resolution images into the high-resolution grid based on an image intensity density function.

21. The system of claim 13, wherein the method further comprises or the computing apparatus is further configured to execute normalizing each pixel of the high-resolution grid.

22. The system of claim 21, wherein each pixel of the high-resolution grid comprises:
a cumulative intensity value representative of the cumulative intensity of the plurality of low-resolution images projected on the pixel of the high-resolution grid; and
a counter value representative of the number of times the plurality of low-resolution images projected on the pixel of the high-resolution grid,
wherein normalizing each pixel of the high-resolution grid comprises dividing the cumulative intensity value by the counter value for each pixel of the high-resolution grid.

23. The system of claim 13, wherein removing back-projection effects from the intermediate super-resolution image using inverse problem solving further comprising applying an image stabilization function to remove at least some noise.

24. The system of claim 13, wherein the initial low-resolution image and the plurality of low-resolution images of the object of interest comprises one of infrared images, visual images, ultraviolet images, and X-ray images.

* * * * *